US008223348B2

(12) United States Patent
Pawlik et al.

(10) Patent No.: US 8,223,348 B2

(45) **Date of Patent: *Jul. 17, 2012**

(54) MEDIA IDENTIFICATION SYSTEM WITH SENSOR ARRAY

(75) Inventors: Thomas D. Pawlik, Rochester, NY (US); Yang Shi, San Diego, CA (US); David J. Glacherio, Rochester, NY (US); John S. Badger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 887 days.

This patent is subject to a terminal disclaimer.

(21) Appl. No.: 12/332,648

(22) Filed: Dec. 11, 2008

(65) Prior Publication Data

US 2010/0149594 A1 Jun. 17, 2010

(51) Int. Cl.
*G06F 3/12* (2006.01)
*G06K 15/00* (2006.01)

(52) U.S. Cl. .......................................... 358/1.1; 358/1.5

(58) Field of Classification Search ................... 358/1.1, 358/1.5, 1.6, 1.8, 1.9, 1.13, 1.14, 1.15, 1.18, 358/449, 498; 347/14, 16, 101; 399/407
See application file for complete search history.

(56) References Cited

U.S. PATENT DOCUMENTS

| | | | | |
|---|---|---|---|---|
| 5,525,809 | A * | 6/1996 | Bolea | 250/559.27 |
| 6,585,341 | B1 * | 7/2003 | Walker et al. | 347/14 |
| 6,809,899 | B1 * | 10/2004 | Chen et al. | 360/125.13 |
| 6,830,398 | B2 | 12/2004 | Yokoi | 400/582 |
| 6,838,687 | B2 | 1/2005 | Tullis et al. | 250/559.07 |
| 7,055,925 | B2 | 6/2006 | Subirada et al. | 347/19 |
| 7,120,272 | B2 | 10/2006 | Guiguizian | 382/100 |
| 7,350,902 | B2 | 4/2008 | Dietl et al. | 347/43 |
| 7,980,553 | B2 * | 7/2011 | Haflinger et al. | 271/152 |
| 2002/0135628 | A1 | 9/2002 | Kolodziej | 347/19 |
| 2003/0213924 | A1 | 11/2003 | Yamaguchi et al. | 250/559.28 |
| 2006/0018696 | A1 * | 1/2006 | Mori et al. | 399/407 |
| 2006/0187441 | A1 | 8/2006 | Sugiyama et al. | 356/3.05 |

FOREIGN PATENT DOCUMENTS

| | | | |
|---|---|---|---|
| FR | 2 786 758 | A1 | 6/2000 |
| WO | WO 2005/022127 | A2 | 3/2005 |

OTHER PUBLICATIONS

U.S. Appl. No. 12/047,359, filed Mar. 13, 2008, Shi et al.
U.S. Appl. No. 12/037,966, filed Feb. 27, 2008, Burke et al.
U.S. Appl. No. 12/037,970, filed Feb. 27, 2008, Burke et al.
U.S. Appl. No. 12/250,717, filed Oct. 14, 2008, Shi et al.

* cited by examiner

*Primary Examiner* — Gabriel Garcia

(74) *Attorney, Agent, or Firm* — Eugene I. Shkurko; Stephen H. Shaw

(57) ABSTRACT

A printing system includes a media input location for storing a recording medium prior to transport within the printing system for subsequent printing; a light source directed toward an extended region of the media input location; an array of photosensors restricted to only a substantially perpendicular movement relative to a plane of the media input location; and an optical path including a first optical path section from the light source to the extended region of the media input location and a second optical path section from the extended region of the media input location to the array of photosensors.

20 Claims, 12 Drawing Sheets

MEDIA IDENTIFICATION SYSTEM WITH SENSOR ARRAY

CROSS REFERENCE TO RELATED APPLICATIONS

Reference is made to commonly assigned, co-pending U.S. patent applications:

U.S. patent application Ser. No. 12/332,670, filed herewith, entitled: "MEDIA IDENTIFICATION SYSTEM WITH MOVING OPTOELECTRONIC DEVICE", by T. D. Pawlik;

U.S. patent application Ser. No. 12/332,722, filed herewith, entitled: "MOVABLE MEDIA TRAY WITH POSITION REFERENCE MARKS", by D. V. Brumbaugh et al., the disclosure(s) of which are incorporated herein; and U.S. patent application Ser. No. 12/332,616, filed herewith, entitled: "MEDIA MEASUREMENT WITH SENSOR ARRAY", by J. J. Haflinger et al.; the disclosures of which are incorporated herein.

FIELD OF THE INVENTION

The present invention relates generally to the field of printers and in particular to identifying a type of recording medium that has been loaded into a printer.

BACKGROUND OF THE INVENTION

In order for a printing system (e.g. inkjet, electrophotographic, thermal, etc.) to print high quality images on a recording medium it is important to know what kind of medium is about to be printed. In the case of inkjet, for example, preferred recording conditions differ for different types of media, partly because different media interact differently with ink. For example, ink is able to wick along the paper fibers in plain paper, so that the spot of ink on the paper is enlarged and irregularly shaped relative to the drop of ink that strikes the paper. Media, which are specially formulated for high quality images, such as photographs, typically have an ink-receiving layer that absorbs the ink in a more controllable fashion, so that the spot size and shape are more regular. Because the colorants are trapped closer to the paper surface, and because a larger quantity of ink can be printed, (the associated carrier fluids being absorbed), an image printed on photographic print media has more vibrant colors than the same image printed on plain paper.

The appropriate amount of ink to use for printing an image on one type of media is different than printing on another type of media. If plain paper receives the same quantity of ink, more appropriately deposited in order to print a high-density image such as a photo that would be used for that same image on photographic print media, the plain paper may not be able to dry quickly enough. Even worse, the plain paper may cockle or buckle in the presence of excess ink, so that the printhead crashes into the printed image, thus smearing the image, but also possibly damaging the printhead. Even for two different types or grades of photographic print media, the amount of ink or number of passes to lay down an image for good tradeoffs in printing quality and printing throughput will be different. It is, therefore, important when receiving image-related data on a specific image to be printed, that the specific image be rendered appropriately for a specific media type that the image will be printed on. Image rendering is defined herein as determining data corresponding to: a) the appropriate amount of ink to deposit at particular pixel locations of the image; b) the number of multiple passes needed to lay the ink down on the media in light of ink-to-ink and ink-to-media interactions; and c) the type of pattern needed to produce the image.

Various means are known in the art for providing information to the printer or to an associated host computer regarding the type of media (e.g. glossy media or matte media of various grades, or plain paper) that is in the input tray of the printer. For example, the user may enter information on media type. Alternatively, there can be a barcode or other type of code pattern printed on the backside of the media that is read to provide information on media type as a sheet of media is picked from the input tray and fed toward the printing mechanism. Alternatively, media characteristics such as optical reflectance can be used to distinguish among media types. Generally, the processes for automatic media type detection require several seconds to provide accurate media-related information on media type. For competitive printers today, it is important to achieve excellent print quality at fast printing throughput. In particular, a user may be dissatisfied if the time required to print the first page of a print job is excessive.

U.S. Pat. No. 6,830,398 discloses one method providing faster printing throughput while enabling automatic media type detection prior to controlling conditions in the printing operation. In U.S. Pat. No. 6,830,398, a load detector is provided for detecting that recording media has been loaded into the printer. In addition, there is provided a sensor, such as a reflective optical sensor, that can discriminate the type of media type after the media has been loaded in the input but before paper feeding starts. In U.S. Pat. No. 6,830,398, when the printer is turned on, or after media loading has been detected, the sensor obtains information about the media type, even before the first page of media is picked for feeding to print a print job. However, conventional printers do not have a sensor capable of reliably discriminating paper type as described in U.S. Pat. No. 6,830,398. For example, the sensor in U.S. Pat. No. 6,830,398 would have difficulty discriminating between matte paper versus plain paper. To date, it has been found that improved reliability of media type detection is provided when the sensor (such as an optical reflective sensor) provides information regarding a plurality of regions or an extended region of the recording medium.

Commonly assigned U.S. Pat. No. 7,120,272; includes a sensor that makes sequential spatial measurements of a recording medium moving relatively to the sensor, where the recording medium contains repeated indicia to determine a repeat frequency and repeat distance of the indicia. The repeat distance is then compared against known values to determine the type of recording medium present.

In a carriage printer, such as an inkjet carriage printer, a printhead is mounted in a carriage that is moved back and forth across the region of printing. To print an image on a sheet of paper or other recording medium (also interchangeably referred to as paper or media herein), the recording medium is advanced a given distance along a recording medium advance direction and then stopped. While the recording medium is stopped and supported on a platen in a print zone relative to the printhead carriage, the printhead carriage is moved in a direction that is substantially perpendicular to the recording medium advance direction as marks are controllably made by marking elements on the recording medium—for example by ejecting drops from an inkjet printhead. After the carriage has printed a swath of the image while traversing the recording medium, the recording medium is advanced, the carriage direction of motion is reversed, and the image is formed swath by swath.

Commonly assigned co-pending U.S. Publication No. 20090213166 and U.S. Pat. No. 7,635,853, disclose methods for identifying a general type of recording medium (e.g. photo paper vs. plain paper) by analyzing a signal from a photosensor that is mounted on the printhead carriage. However, these co-pending patent applications disclose waiting until the recording medium is advanced into the print zone to scan the recording medium with the photosensor. This can increase the time required before the first print is available.

Commonly assigned co-pending U.S. Pat. No. 8,033,628, discloses a method for identifying a type of recording medium by using identification marks provided on the recording medium, for example on its back side. An embodiment described therein uses the motion of the recording medium as it is being picked from the media input tray in order to move the identification marks past a sensor. In other words, this co-pending application discloses waiting until a print job is initiated and recording medium is being picked. This can increase the time required before the first print is available. Special methods for identifying locations of marks are also disclosed in U.S. Pat. No. 8,033,628, in order to compensate for errors in measuring spacings between marks that are due; for example, to media slippage during advance of the recording medium.

What is needed is a way to reliably identify a type of recording medium at a media input location in a printing system before a print job is initiated.

SUMMARY OF THE INVENTION

The aforementioned need is met by the invention disclosed within in that a novel printing system now includes a media input location for storing a recording medium prior to transport within the printing system for subsequent printing; a light source directed toward an extended region of the media input location; an array of photosensors restricted to only a substantially perpendicular movement relative to a plane of the media input location; and an optical path including a first optical path section from the light source to the extended region of the media input location and a second optical path section from the extended region of the media input location to the array of photosensors.

Another aspect of the invention provides a method for identifying a type of recording medium within a printing system, including the steps of:

providing a media input location for storing a recording medium prior to transport within the printing system for subsequent printing;

providing a light source;

providing an array of photosensors restricted to only a substantially perpendicular movement relative to a plane of the media input location;

providing an optical path including a first optical path section from the light source to the extended region of the media input location and a second optical path section from the extended region of the media input location to the array of photosensors;

providing a printing system controller including a table of data corresponding to spatially varying optical patterns for a plurality of recording media types;

directing light from the light source toward an extended region of the media input location;

receiving light from the light source by a plurality of photosensors of the array of photosensors, the light having been reflected from extended region of the media input location to produce an electronic signal in each of the plurality of photosensors;

transmitting the electronic signals to the printing system controller to provide data corresponding to a spatially varying pattern; and comparing the data corresponding the spatially varying pattern to the table of data, thereby identifying the type of recording medium that is stored in the media input location of the printing system.

DETAILED DESCRIPTION OF THE INVENTION

Figure 1:
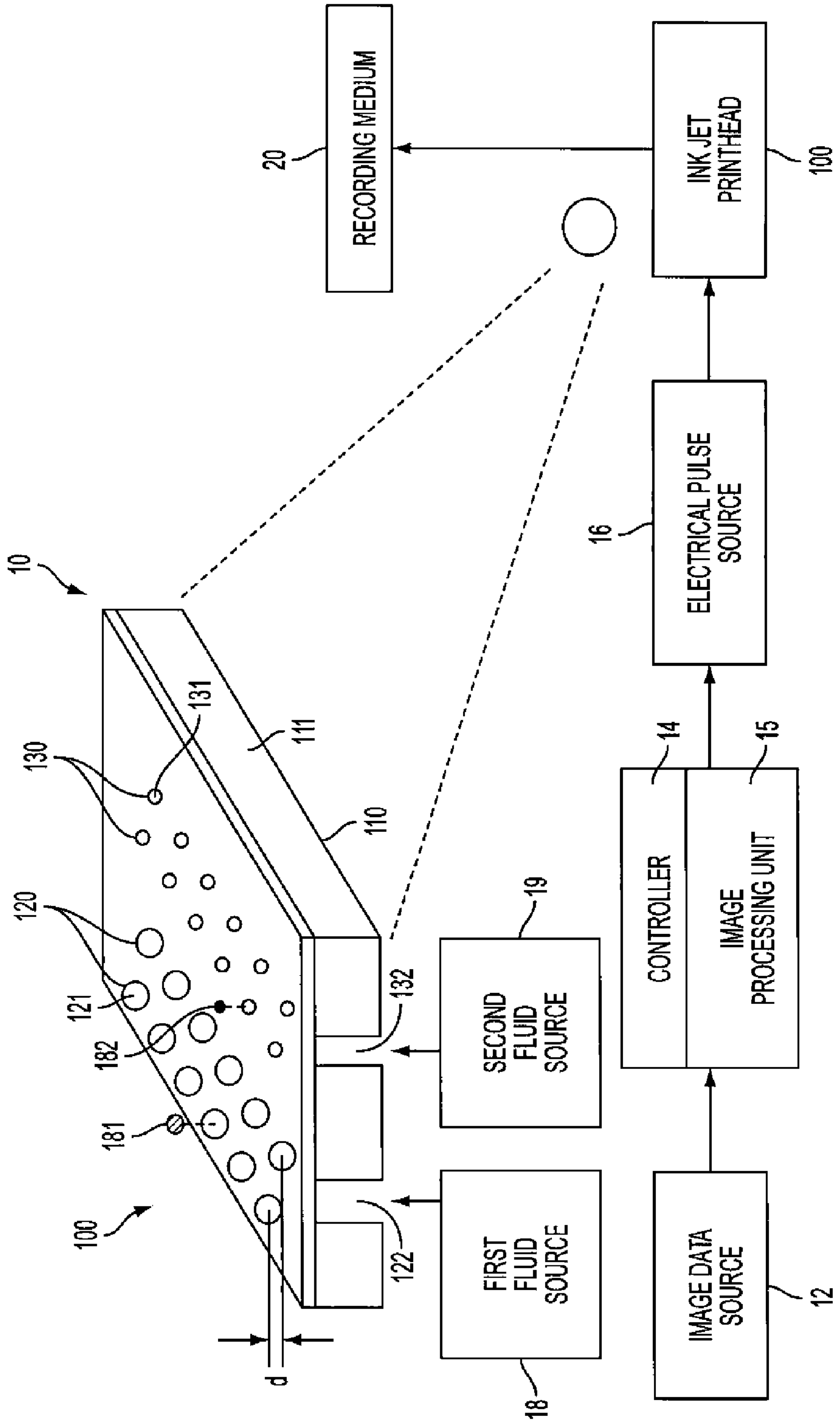
FIG. 1 (PRIOR ART)
FIG. 1 is a schematic representation of an inkjet printer system.

Referring to FIG. 1, a schematic representation of an inkjet printer system 10 is shown, as described in U.S. Pat. No. 7,350,902; and incorporated by reference herein in its entirety. Inkjet printer system 10 includes an image data source 12 of image data, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays. Nozzles in the first nozzle array 121, in the first nozzle array 120, have a larger opening area than nozzles in second nozzle array 131, in the second nozzle array 130. In this example, each of the two nozzle arrays has two staggered rows of nozzles, each row having a nozzle density of 600 per inch. The effective nozzle density then in each array is 1200 per inch. If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink delivery pathway. Ink delivery pathway 122 is in fluid communication with first nozzle array 120, and ink delivery pathway 132 is in fluid communication with second nozzle array 130. Portions of ink delivery pathways 122 (for first nozzle array) and 132 (for second nozzle array) are shown in FIG. 1 as openings through printhead die substrate 111. One or more inkjet printhead die 110 will be included in inkjet printhead 100, but only one inkjet printhead die 110 is shown in FIG. 1. The inkjet printhead die 110 is arranged on a support member as discussed below relative to FIG. 2. In FIG. 1, first fluid source 18 supplies ink to first nozzle array 120 via ink delivery pathway 122, and second fluid source 19 supplies ink to second nozzle array 130 via ink delivery pathway 132. Although distinct, first fluid source 18 and second fluid source 19 are shown, in some applications it may be beneficial to have a single ink source supplying ink to first nozzle array 120 and second nozzle array 130 via ink delivery pathways 122 and 132, respectively. Also, in some embodiments, fewer than two, or more than two, nozzle arrays may be included on inkjet printhead die 110. In some embodiments, all nozzles on an inkjet printhead die 110 may be the same size, rather than having multiple sized nozzles on a printhead die 110.

Not shown in FIG. 1, are the drop forming mechanisms associated with the nozzles. Drop forming mechanisms can be of a variety of types, some of which include a heating element to vaporize a portion of ink and thereby causing the ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplet(s) ejected from first nozzle array 181 ejected from first nozzle array 120 are larger than droplet(s) ejected from second nozzle array 182 ejected from second nozzle array 130, due to the larger nozzle opening area. Typically other aspects of the drop forming mechanisms (not shown) associated respectively with first nozzle array 120 and second nozzle array 130 are also sized differently in order to optimize the drop ejection process for the different sized drops. During operation, droplets of ink are deposited on a recording medium 20.

Figure 2:
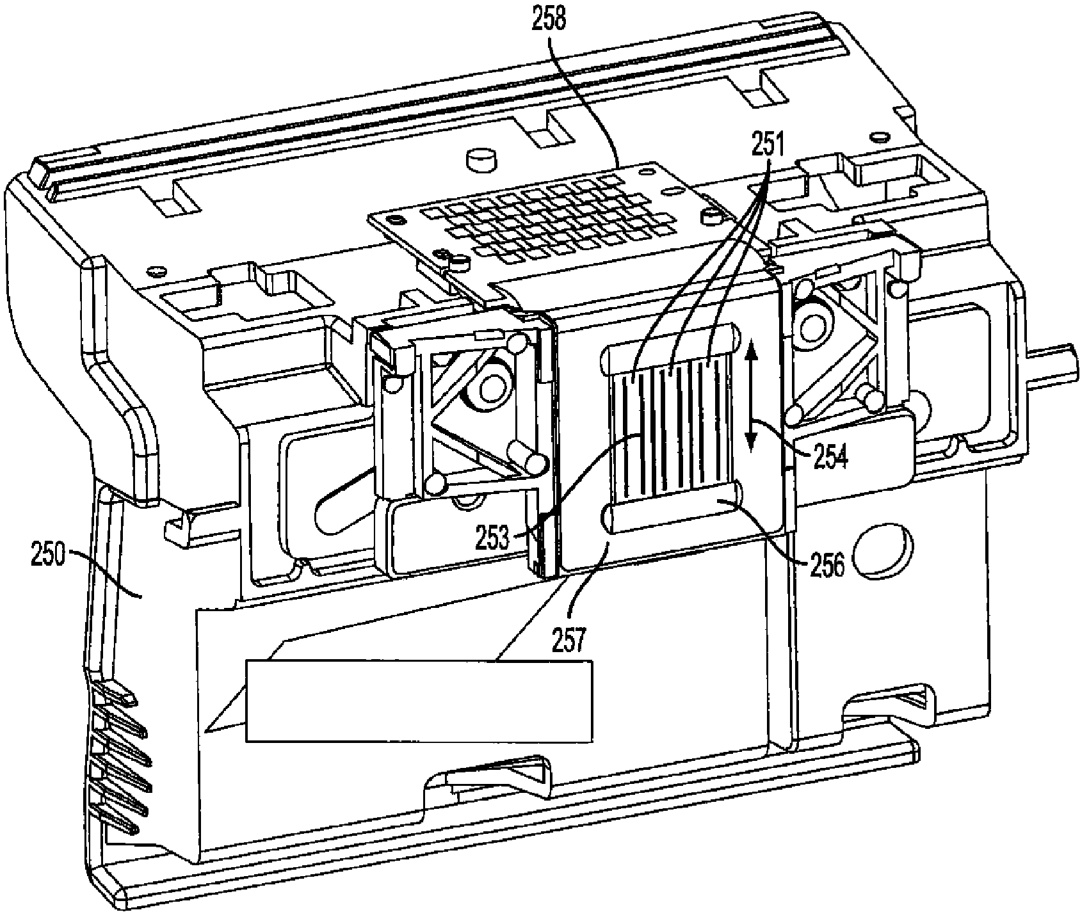
FIG. 2 is a perspective view of a portion of a printhead chassis.

FIG. 2 shows a perspective view of a portion of a printhead chassis 250, which is an example of an inkjet printhead 100. Printhead chassis 250 includes three printhead die 251 (similar to inkjet printhead die 110), each printhead die including two nozzle arrays 253, so that printhead chassis 250 comprises six nozzle arrays 253 altogether. The six nozzle arrays 253 in this example can be each connected to separate ink sources (not shown in FIG. 2); such as cyan, magenta, yellow, text black, photo black, and a colorless protective printing fluid. Each of the six nozzle arrays 253 is disposed along nozzle array direction 254, and the length of each nozzle array along nozzle array direction 254 is typically on the order of 1 inch or less. Typical lengths of recording media 20 are 6 inches for photographic prints (4 inches by 6 inches) or 11 inches for paper (8.5 by 11 inches). Thus, in order to print the full image, a number of swaths are successively printed while moving printhead chassis 250 across the recording medium 20. Following the printing of a swath, the recording medium 20 is advanced along a media advance direction 304 that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead chassis 250 and connects to connector board 258. When printhead chassis 250 is mounted into the carriage 200 (see FIG. 3), connector board 258 is electrically connected to a connector (not shown) on the carriage 200, so that electrical signals may be transmitted to the printhead die 251.

Figure 3:
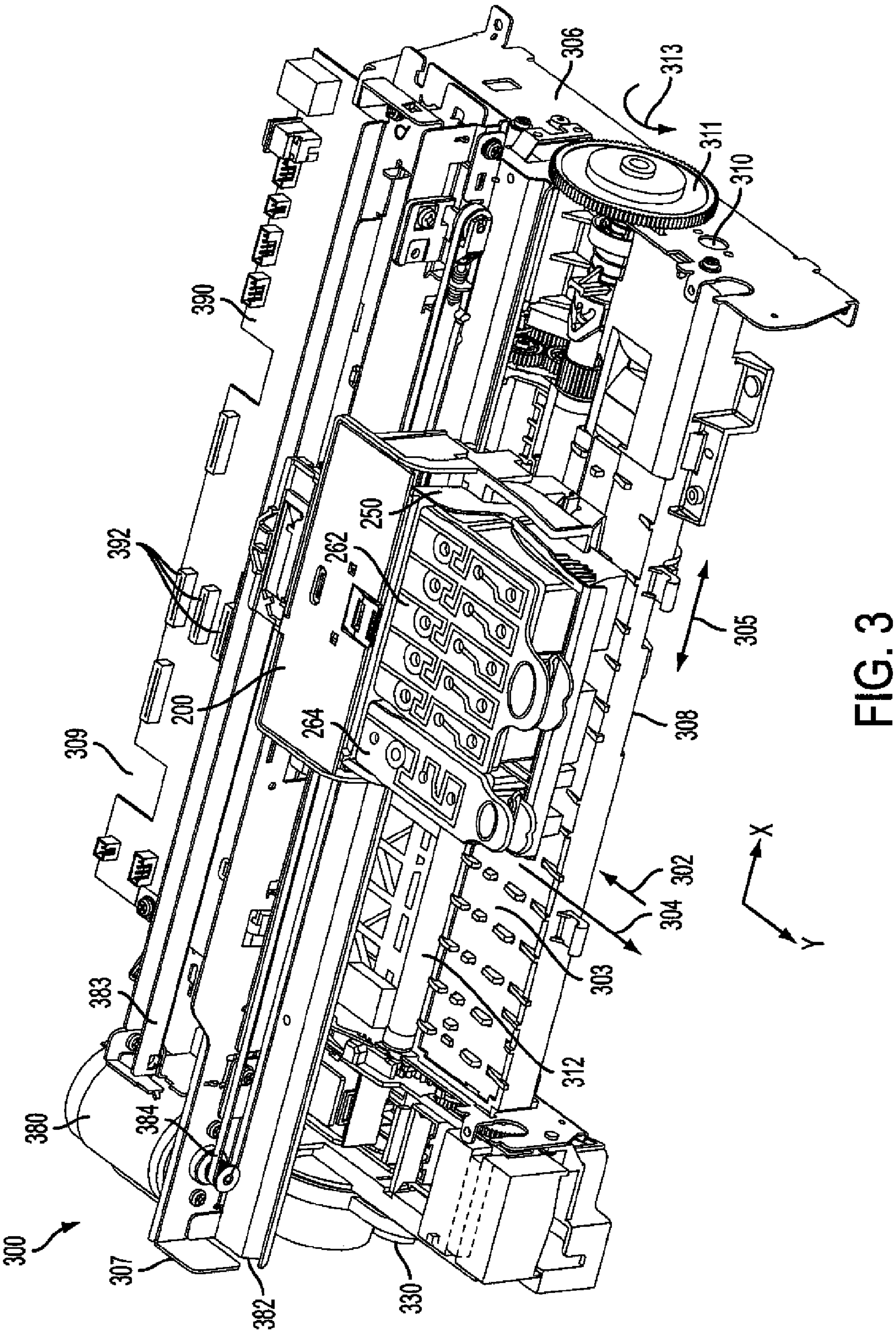
FIG. 3 is a perspective view of a portion of a carriage printer.

FIG. 3 shows a portion of a desktop carriage printer. Some of the parts of the printer have been hidden in the view shown in FIG. 3, so that other parts may be more clearly seen. Printer chassis 300 has a print region 303 across which carriage 200 is moved back and forth in carriage scan direction 305 along the X axis, between the right side of printer chassis 306 and the left side of printer chassis 307 of printer chassis 300; while drops are ejected from printhead die 251 on printhead chassis 250 that is mounted on carriage 200. Carriage motor 380 moves belt 384 to move carriage 200 along carriage guide rail 382. An encoder sensor (not shown) is mounted on carriage 200 and indicates carriage location relative to an encoder fence 383.

Printhead chassis 250 is mounted in carriage 200, and multi-chamber ink supply 262 and single-chamber ink supply 264 are mounted in the printhead chassis 250. The mounting orientation of printhead chassis 250 is rotated relative to the view in FIG. 2, so that the printhead die 251 are located at the bottom side of printhead chassis 250, the droplets of ink being ejected downward onto the recording medium in print region 303 in the view of FIG. 3. Multi-chamber ink supply 262, in this example, contains five ink sources: cyan, magenta, yellow, photo black, and colorless protective fluid; while single-chamber ink supply 264 contains the ink source for text black. Paper or other recording media (sometimes generically referred to as paper herein), is loaded along paper load entry direction 302 toward the front of printer chassis 308 of printer chassis 300.

Figure 4:
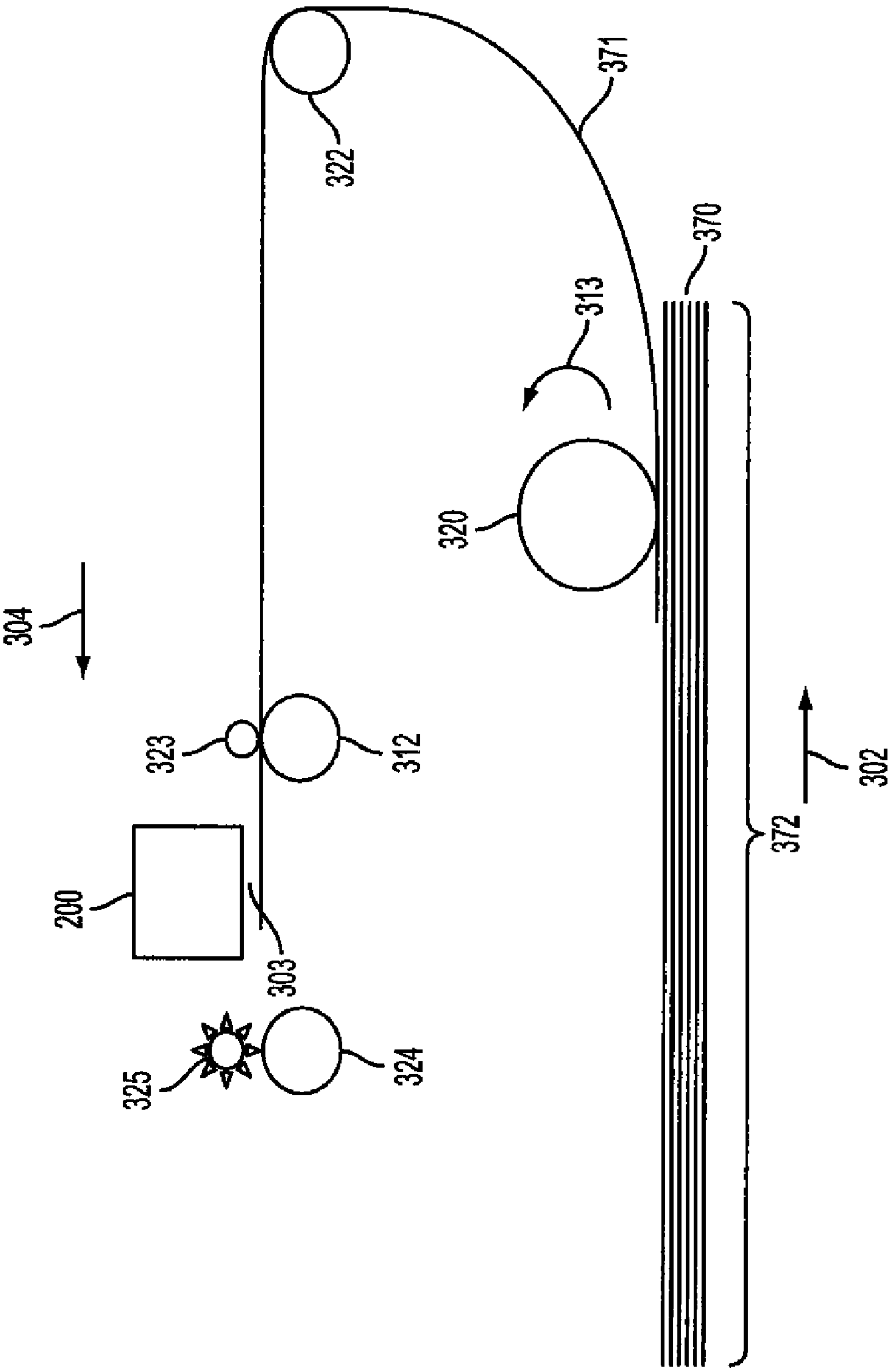
FIG. 4 is a schematic side view of a paper path in a carriage printer.

A variety of rollers are used to advance the medium through the printer, as shown schematically in the side view of FIG. 4. In this example, a pick-up roller 320 moves the top sheet of medium 371 of a stack 370 of paper or other recording media from the media input location 372 in the direction of arrow for paper load entry direction 302. The media input location can be at an input tray, for example. A turn roller 322 acts to move the paper around a C-shaped path (in cooperation with a curved rear-wall surface) so that the paper continues to advance along media advance direction 304 from the rear of printer chassis 309 of the printer (with reference also to FIG. 3). The paper is then moved by feed roller 312 and idler roller(s) 323 to advance along the media advance direction 304 across print region 303, and from there to a discharge roller 324 and star wheel(s) 325, so that printed paper exits along media advance direction 304. Feed roller 312 includes a feed roller shaft along its axis, and feed roller gear 311 is mounted on the feed roller shaft. Feed roller 312 may consist of a separate roller mounted on the feed roller shaft, or may consist of a thin high-friction coating on the feed roller shaft.

The motor that powers the paper advance rollers is not shown in FIG. 3, but the hole 310 at the right side of the printer chassis 306 is where the motor gear (not shown) protrudes through in order to engage feed roller gear 311, as well as the gear for the discharge roller 324 (not shown). For normal paper pick-up and feeding, it is desired that all rollers rotate in forward rotation direction 313. Toward the left side of printer chassis 307, in the example of FIG. 3, is the maintenance station 330.

Toward the rear of printer chassis 309 of the printer chassis 300, in this example, is located the printer electronics board 390, which contains cable connectors 392 for communicating via cables (not shown) to the carriage 200 and from there to connector board 258 (in FIG. 2). Also on the printer electronics board 390, are typically mounted motor controllers for the carriage motor 380 and for the paper advance motor, a processor and/or other control electronics (shown schematically as controller 14 and image processing unit 15 (in FIG. 1), for controlling the printing process, and an optional connector for a cable to a host computer.

For the C-shaped paper path shown in FIG. 4, the recording stack of media 370 is loaded backside facing up at media input location 372. The backside of the media is the side of the sheet that is not intended for printing. Specialty media having glossy, luster, or matte finishes (for example) for different quality media may be marked on the backside by the media manufacturer to identify the media type. In addition to information on printing surface finishes, marking code patterns can provide information on recording medium thickness, length, width, orientation, etc.

Embodiments of the present invention use an array (either one-dimensional or two-dimensional) of photosensors to produce electronic signals that vary among the photosensors in the array, corresponding to optical variations in an extended region of a sheet of medium (e.g. top sheet of medium 371) in the media input location 372. In contrast to examples disclosed in commonly assigned co-pending U.S. patent application Ser. No. 12/047,359, that rely on the motion of top sheet of medium 371 as it is being picked from stack of media 370 at media input location 372 in order to bring a plurality of regions of the top sheet of medium 371 sequentially past the field of view of a backside media sensor in order to provide a time-varying electronic signal, embodiments of the present invention rely on variation in photosensor signals at different photosensors in the array before the top sheet of medium 371 is moved from the media input location 372. The variation in photosensor signals is then processed and compared to a table of reference signal variations in order to identify the type of recording medium prior to printing.

The photosensor arrays can be of the charge coupled device type or the contact image sensor type. In a charge coupled device array, each charge coupled device builds up an electrical charge in response to exposure to light. The size of the electrical charge build-up is dependent on the intensity and the duration of the light exposure. The charge built-up in each of the charge coupled devices is measured and discharged at regular sampling intervals. An image of an extended linear region of the top sheet of medium 371 can be projected onto the charge coupled device sensor array by optical elements including an imaging lens that typically reduces, considerably, the size of the projected image from the its' original size and provide good depth of field. However, because the photoreceptors are so small in the charge coupled device device, a fairly strong light source such as a fluorescent lamp is preferably used to illuminate the media input location in order to provide sufficient signal strength at each photoreceptor site.

A second type of photosensor array is the contact image sensor. The photoreceptors in a contact image sensor are substantially the same size as the imaging resolution of the array. Because the photoreceptors in a contact image sensor are so much larger than they are in a charge coupled device, a lower power light source (such as one or more LED) is sufficient to provide enough illumination in the media input location 372. A contact image sensor has a short depth of field and is preferably mounted in contact with, or at a small controlled distance from, the top sheet of medium 371.

U.S. Pat. No. 6,838,687 discloses using a one-dimensional or two-dimensional array of photosensors to distinguish among different kinds of recording media in a printer by sensing reflections of light from multiple light sources at different incidence angles to reveal the fine structure of the media surface. The configuration of the photosensor array disclosed in U.S. Pat. No. 6,838,687 appears to be the charge coupled device type (described above) that is disposed at a distance from the media surface with an imaging lens between the photosensor array and the media surface. U.S. Pat. No. 6,838,687 appears to contemplate analyzing the recording media at a position where a single sheet is present, rather than a top sheet of stack of media at a media input location, as evidenced by use of a transmission illuminator (12). U.S. Pat. No. 6,838,687 does not disclose how to keep the media sufficiently in focus relative to the photosensor array as multiple sheets of media are successively used.

Figure 5:
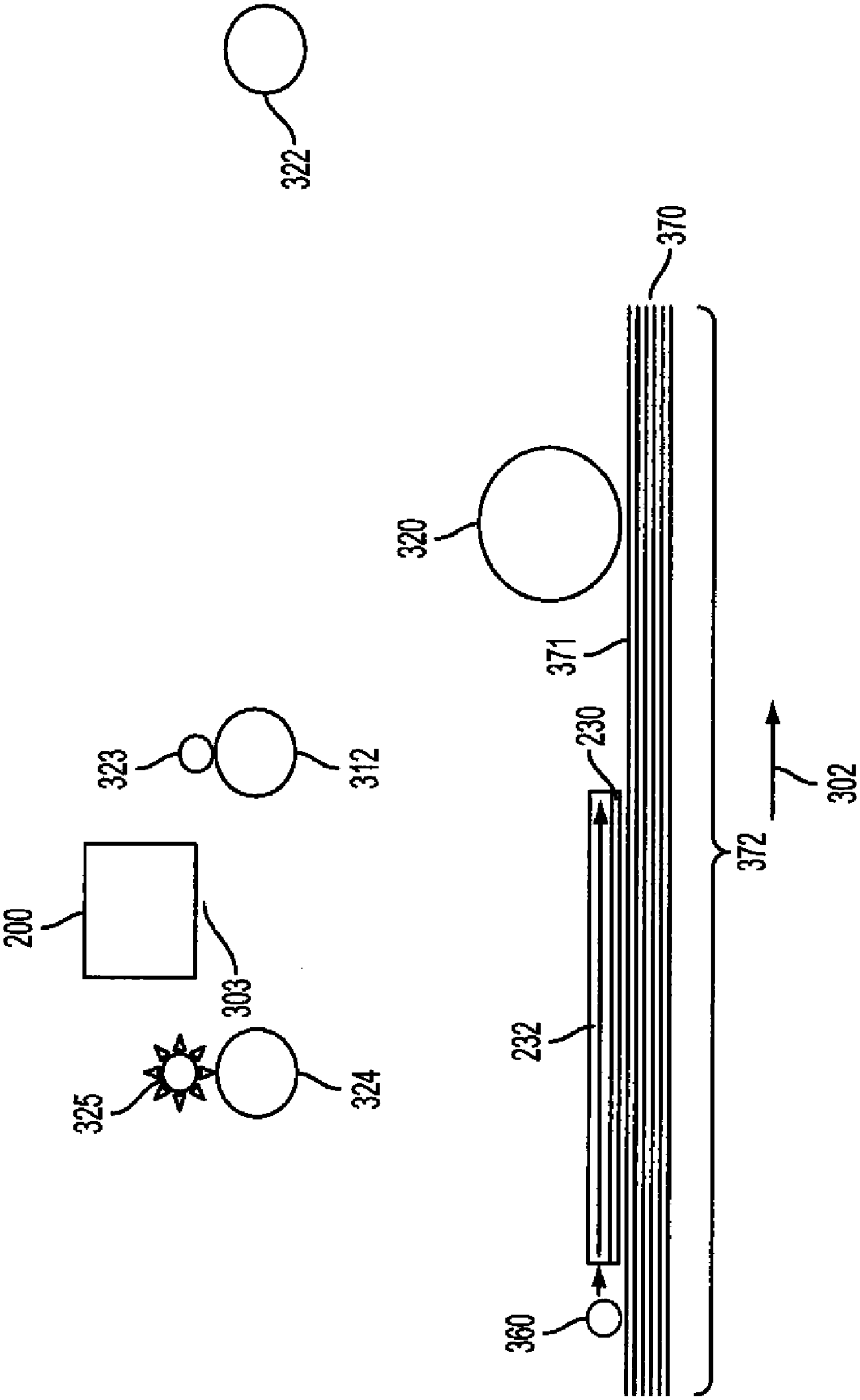
FIG. 5 is a schematic side view of a paper path having a contact image sensor positioned at the media input location.

FIG. 5 shows the same view as in FIG. 4, but the top sheet of medium 371 is still at media input location 372, and a contact image sensor linear photosensor array 230 is positioned parallel to and over the top sheet of medium 371. A light source 360, such as an LED, emits light into a light distributing bar 232, positioned adjacent to the contact image sensor linear photosensor array 230 and also adjacent to the top sheet of medium 371. Although the word "light" is used herein, the term is not meant to exclude wavelengths outside the visible spectrum. In some contemplated embodiments, infrared illumination is used, for example. The photosensors in the photosensor array must be sensitive to the wavelength of light coming from the recording medium. For embodiments where light source 360 is an infrared light source, an infrared photosensor array would be used. The contact image sensor linear photosensor array 230 is also associated with one or more lenses (not shown), that focus light from the top sheet of medium 371 onto adjacent photosensor sites in the array. The arrows in FIG. 5 represent a first section of the optical path in which the light emitted from light source 360 travels along light distributing bar 232 in order to illuminate an extended linear region of the top sheet of medium 371 at the media input location 372. Light distributing bar 232 is preferably at least as long as contact image sensor linear photosensor array 230 in order to provide uniform illumination to the region of top sheet of medium 371 that is adjacent the photosensor array. More generally, the light distributor can be a body that is not bar-shaped, but a bar shape is typical for illuminating a linear photosensor array.

In the embodiment shown in FIG. 5, the contact image sensor linear photosensor array 230 and light distributing bar 232 are aligned along the paper load entry direction 302 so that sheets of recording medium are advanced from media input location 372. However, in other embodiments, the contact image sensor linear photosensor array 230 and light distributing bar 232 can be aligned along the carriage scan direction (into and out of the plane of FIG. 5), or at other orientations parallel to the plane of the top sheet of medium 371.

Figure 6B:
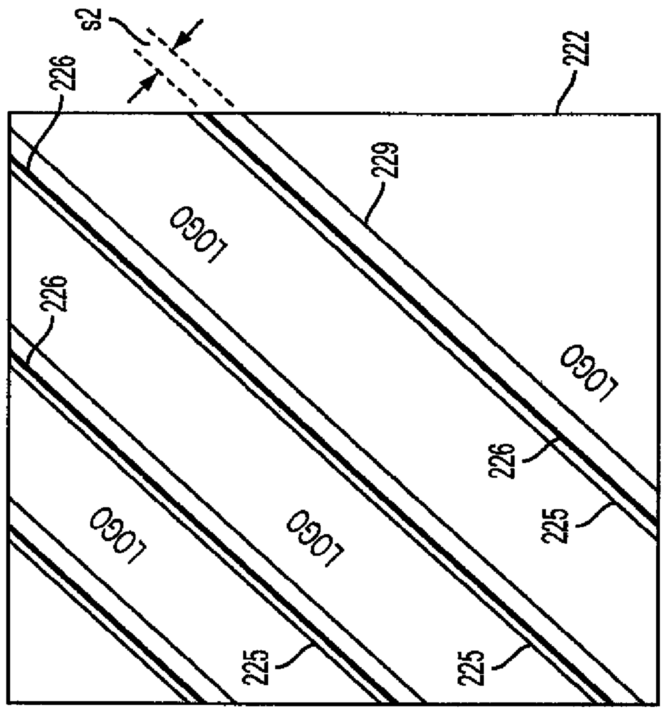
FIGS. 6*a* and 6*b* show schematic representation of markings on the backside of a first type of recording medium and a second type of recording medium respectively.

FIGS. **6*a* and 6*b* show schematic representation of marking patterns on the backside of a first type of recording medium 221 and a second type of recording medium 222 respectively. In this embodiment, the marking pattern of each of the various types of recording media has a reference marking consisting of a pair of "anchor bars" 225 and 226 (first and second, respectively), which are located at a fixed distance with respect to one another for all media types. In addition, there is a first identification mark 228 on the first type of recording medium 221 in FIG. 6***a*, and there are second identification marks 229 on the second type of recording medium 222 in FIG. 6*b*. In this example, first identification marks 228 is spaced a distance s1 away from second anchor bar of anchor bar pairs 226 on first type of recording medium 221, and second identification marks 229 is spaced a distance s2 away from second anchor bar of anchor bar pairs 226 on second media type 222, such that s1 does not equal s2. Thus in this example, it is the spacing of the identification mark from one of the anchor bars that identifies the particular type of recording medium. The marking pattern is repeated several times on the backside of the recording medium. The marking pattern is oriented at a predetermined angle with respect to the sides of the recording medium, and the recording medium is oriented at the media input location with a side parallel to the paper load entry direction 302 that sheets of recording medium are advanced from media input location 372.

Figure 6A:
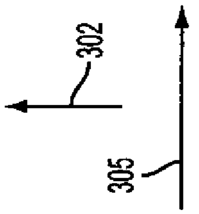
Figure 6A:
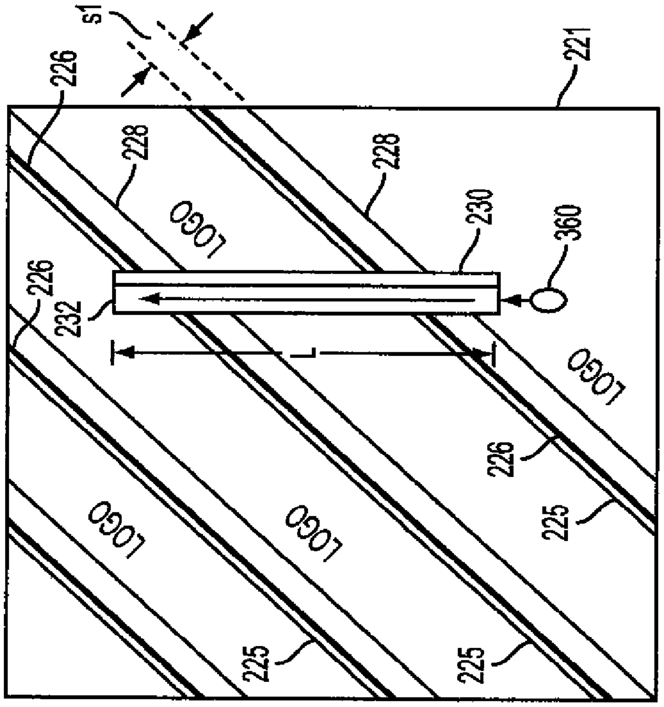

The top view of FIG. 6*a* shows linear photosensor array 230 and light distributing bar 232 extending along paper load entry direction 302. Linear photosensor array 230 extends across two sets of anchor bars 225 and 226 (first and second, respectively) and two sets of first identification marks 228 on first type of recording medium 221. It is necessary for the linear photosensor array to extend a length L that is at least long enough to extend across one marking pattern, and it can be advantageous, if the linear photosensor array is long enough to extend across more than one marking pattern, in order to be sure that the sensor array extends fully across a single marking pattern. Thus, a preferred range for the array length is 5 mm<L<75 mm, and a more preferred range is 20 mm<L<60 mm.

Figure 7A:
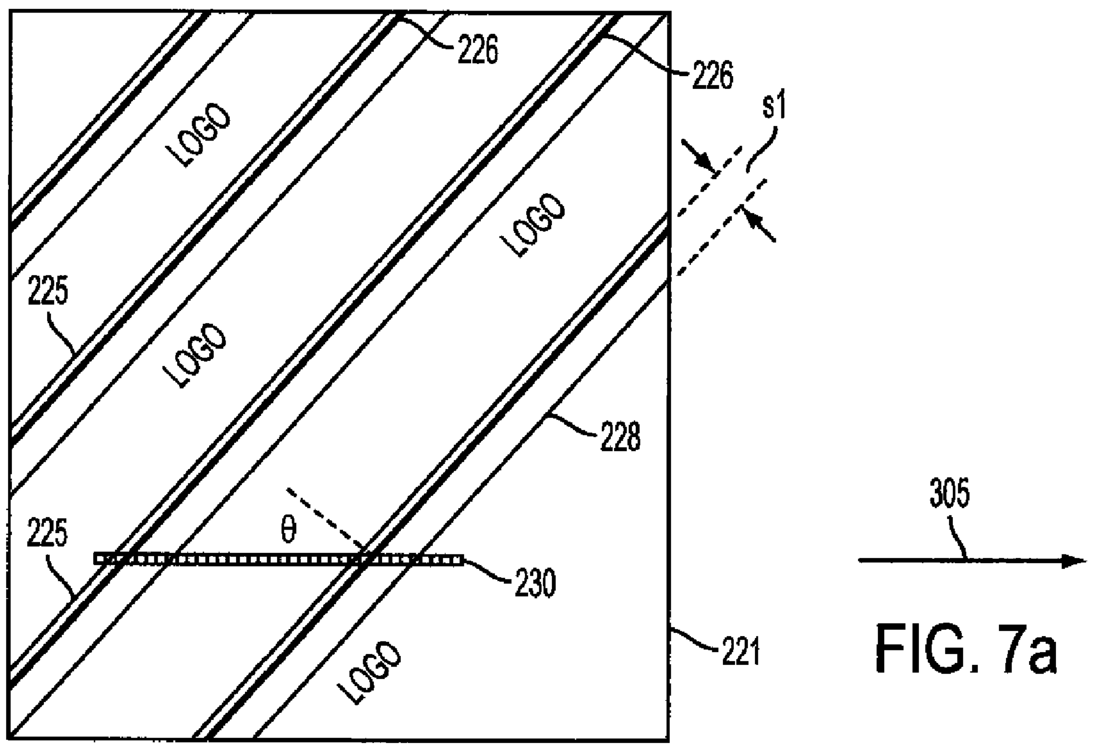
FIG. 7*a* shows a schematic view of a linear photosensor array positioned across adjacent markings of the type shown in FIG. 6*a;*

FIG. 7*a* is similar to FIG. 6*a*, but in FIG. 7*a* the linear photosensor array 230 extends along carriage scan direction 305, i.e. substantially perpendicular to paper load entry direction 302. In FIG. 7*a*, the linear photosensor array 230 is shown as if it were transparent, so that it can be seen how the location of the anchor bars 225 and 226 (first and second, respectively) and the first identification marks 228 correspond to different sites of the linear photosensor array. The light source and the light distributing bar are omitted in FIG. 7*a* for clarity. Also for clarity in FIG. 7*a*, the sites along the linear photosensor array are shown at a much coarser resolution than for an actual contact image sensor array. In a typical linear photosensor array 230, the photosensors can be spaced at a resolution ranging from 200 per inch to 1200 per inch, for example.

Figure 7B:
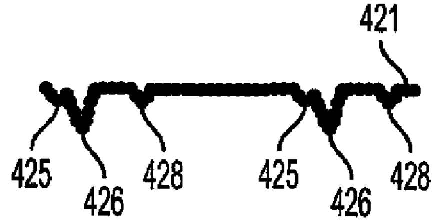
FIG. 7*b* shows a representation of an electronic output signal from linear photosensor array shown in FIG. 7*a;*

FIG. 7*b* represents the photosensor array output signal 421 corresponding to the linear photosensor array 230 located with respect to anchor bars 225 and 226 (first and second, respectively) and first identification marks 228 as shown in FIG. 7*a*. The electronic output signal of a photosensor is larger when more light is received, so that a spatially-varying photosensor array output signal 421 is provided. For the case where the anchor bars and identification marks absorb light to a greater extent than the backside media surface, when the backside surface of the media is in the field of view (without other markings), the photosensor signal will be approximately at a high background level. When anchor bars, identification marks, logos, or other markings are in the field of view of the photosensor, the photosensor signal decreases. When a mark is fully in the field of view of the photosensor, the photosensor signal is at a relative low point. (Note: Subsequent signal processing can result in such low points being peaks rather than valleys in the signal, and they will generally be referred to as peaks herein.) A characteristic spatially-varying set of manufacturer's markings provides a corresponding characteristic spatially-varying photosensor array output signal 421 from linear photosensor array 230. In the example shown in FIGS. 7*a* and 7*b*, peaks 425 correspond to anchor bars 225, peaks 426 correspond to second anchor bar of anchor bar pairs 226, and peaks 428 correspond to first identification marks 228. Although the marking patterns in FIGS. 7*a* and 7*b* are two-dimensional patterns, the linear photosensor array linear photosensor array 230 provides a one-dimensional slice of the pattern, corresponding to the location of linear photosensor array 230. Thus, photosensor array output signal 421 provides data corresponding to a one-dimensional spatial variation of the pattern.

The light signal reflected from the manufacturer's marking is different from the light signal on the rest of the backside of the media, so that different spacings or widths of markings may be detected as different spacings or widths of peaks or valleys of the photosensor signal. In some examples, the markings can be made using an IR absorbing material, and the light source 360 can be an infrared light source, so that light reflected from the manufacturer's markings produces a lower amplitude signal in corresponding photosensors of linear photosensor array 230 than if the field of view only includes unmarked portions of media. In other examples, fluorescent materials can be used to provide the marking information, rather than light absorbing materials. In such examples, relative interaction between the light emitted from the light source 360 and the markings or the rest of the backside of the media can be different. Rather than absorbing light to a greater extent than the rest of the media, the fluorescing information markings can provide greater light to the corresponding photosensors than the rest of the media. In general, the photosensor signal corresponding to the information markings is different from the photosensor signal corresponding to the rest of the backside surface of the media.

For embodiments where the linear photosensor array is perpendicular to the orientation of the bars of the marking pattern, distances such as s1 or s2 can be measured with respect to corresponding signals from photosensors spaced a distance of approximately s1 or s2 apart. If the spacing between adjacent photosensors in the linear photosensor array is d, the spacing between bars of the marking pattern can be provided in terms of nd, where n is an integer representing the number of photosensor spacings that two signal features, such as peaks, are identified. For embodiments such as the one shown in FIG. 7*a*, where the linear photosensor array is oriented at an angle θ relative to the perpendicular to the orientation of the bars of the marking pattern, the spacing s1 is given by s1=(nd sin θ). By measuring centroids of peak signals along the linear photosensor array, the spacing s1 can be provided relative to non-integer multiples of the photosensor spacing on the linear photosensor array.

Prior to signal analysis, the photosensor array output signal 421 can be amplified and filtered to reduce background noise and then digitized in an analog to digital converter. Once the amplified photosensor signal has been digitized, digital signal processing can be used to further enhance the signal relative to high frequency background noise.

Because the recording medium is not being moved during media type identification, and because the distance between markings or spacing between markings can be related to precise spacings of photosensors along the linear photosensor array, embodiments of the present invention are not susceptible to motion inaccuracies such as media slippage.

A table relating characteristic spatially-varying photosensor array output signals 421 with a corresponding plurality of media types is stored in printer memory in printing system controller 14. The measured spatially-varying photosensor array output signal 421 is compared to the table in order to identify the type of recording medium that is stored in the media input location 372. The table can include, for example, peak spacings or peak widths that can be compared with peak spacings or peak widths identified by the printing systems controller 14 from the spatially-varying photosensor array output signal 421.

Figure 8:
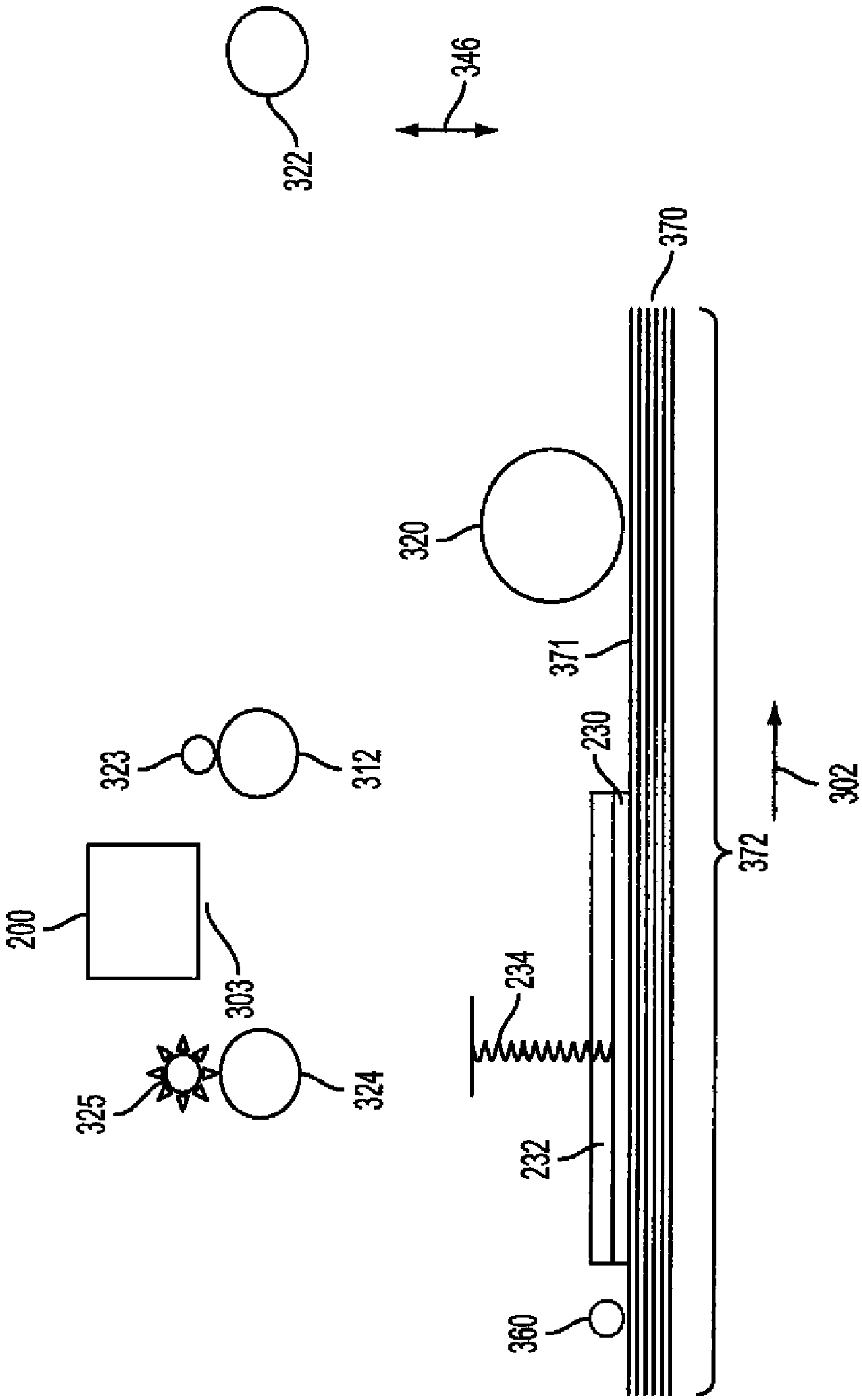
FIG. 8 shows a schematic view of a paper path having a contact image sensor held against the top sheet at the media input location by spring force.
Figure 9:
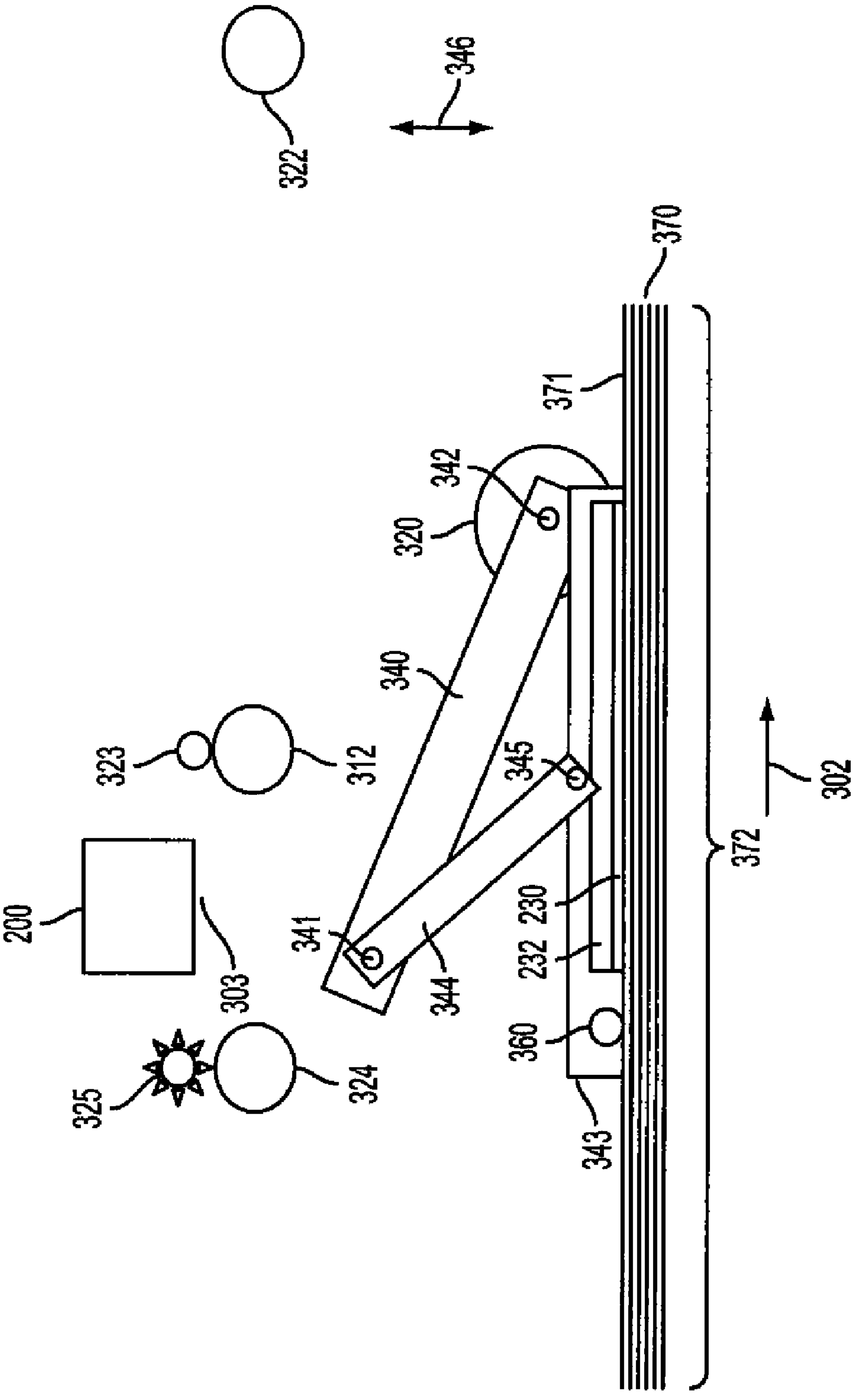
FIG. 9 shows a schematic view of a paper path having a photosensor array that is pivotally mounted.

As sheets of media are removed from or added to stack of media 370 shown in FIG. 5, in some embodiments where the linear photosensor array is a contact image sensor, the distance between top sheet of medium 371 and the contact image sensor linear photosensor array 230 is held constant, for example, by forcing the contact image sensor linear photosensor array 230 into contact with the first sheet by use of spring force represented schematically by spring 234 in FIG. 8. In other embodiments, the contact image sensor linear photosensor array 230 is sufficiently weighted that gravity keeps it in contact with the top sheet of medium 371. In still other embodiments, a media tray holding stack of media 370 is moved up and down to keep the contact image sensor linear photosensor array 230 in contact with the top sheet of medium 371. In yet other embodiments, contact image sensor linear photosensor array 230 is pivotally mounted as shown in FIG. 9. In the example shown in FIG. 9, the pick-up roller 320 includes a pick-up roller axle 342 that is rotationally mounted near one end of pick-up arm 340. Near the other end of pick-up arm 340, pivot axis 341 allows pick-up roller 320 to stay in contact with top sheet of medium 371 as the height of stack of media 370 changes during loading and usage of recording medium. Similarly, sensor array assembly 343 (including light source 360, light distributing bar 232, and contact image sensor linear photosensor array 230) is pivotally mounted on sensor array assembly pivot mount 345 near one end of sensor array assembly pivot arm 344. Near its other end, sensor array assembly pivot arm 344 is pivotally mounted on pivot axis 341. Sensor array assembly pivot arm 344 is coaxially mounted with pick-up arm 340, and in some embodiments, sensor array assembly pivot arm 344 can be pick-up arm 340. Pivot mounting 341 of sensor array assembly pivot arm 344 allows sensor array assembly 343 to stay in contact with top sheet of medium 371 as the height of stack of media 370 changes. Sensor array assembly pivot mount 345 allows sensor array assembly 343 to align itself with the plane of top sheet of medium 371 as the media stack height changes. In these embodiments, the photosensor array itself may be in contact with the top sheet of medium 371, or it may be held off from the top sheet by a spacer (not shown) to keep the photosensor array at a constant but non-zero distance from the top sheet of medium 371.

The linear photosensor array 230 is restricted to only a substantially perpendicular movement relative to the plane of the media input location indicated by double arrow 346 in FIGS. 8 and 9, where the substantially perpendicular movement enables keeping the top sheet of medium 371 sufficiently in focus. In the pivot mount example of FIG. 9, the sensor array assembly 343 can rotate in order to stay parallel to the plane of top sheet of medium 371, and the pivot motion of the sensor array assembly pivot arm 344 includes a small component of motion parallel to the plane of top sheet of medium 371, but these pivoting motions are regarded herein as consistent with the photosensor array being restricted to substantially perpendicular movement relative to the top sheet of medium 371, and therefore to a plane of the media input location.

Figure 10A:
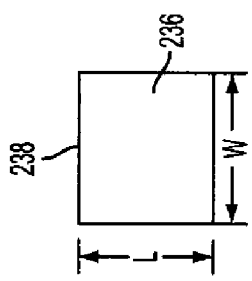
FIG. 10*a* shows a schematic view of a two-dimensional photosensor array.
Figure 10B:
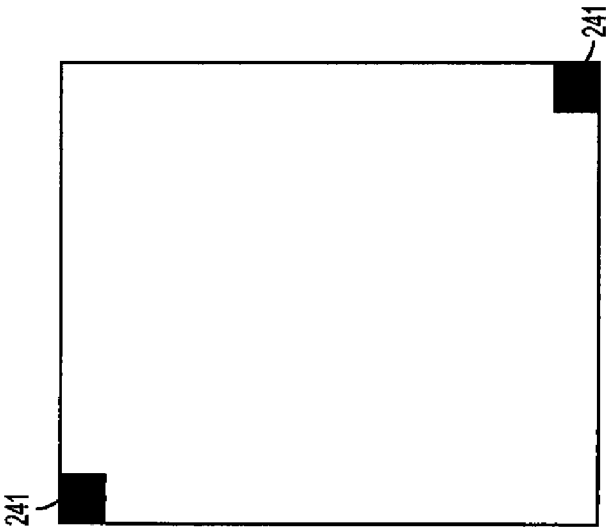
FIGS. 10*b*, 10*c*, and 10*d* show schematic representations of two-dimensional marking patterns that can be used to identify types of recording medium.
Figure 10C:
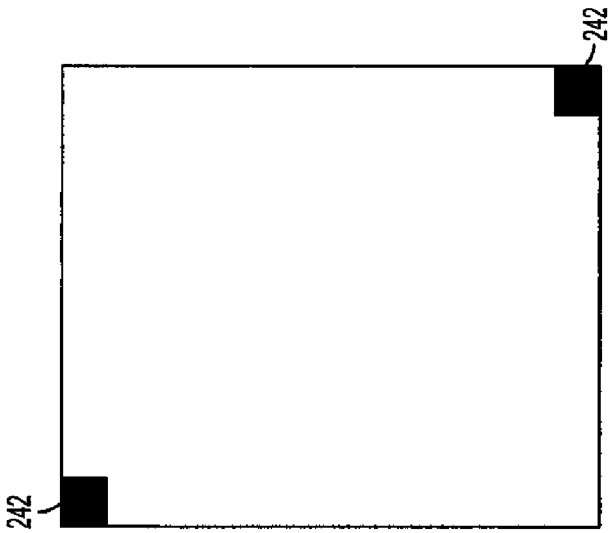
Figure 10D:
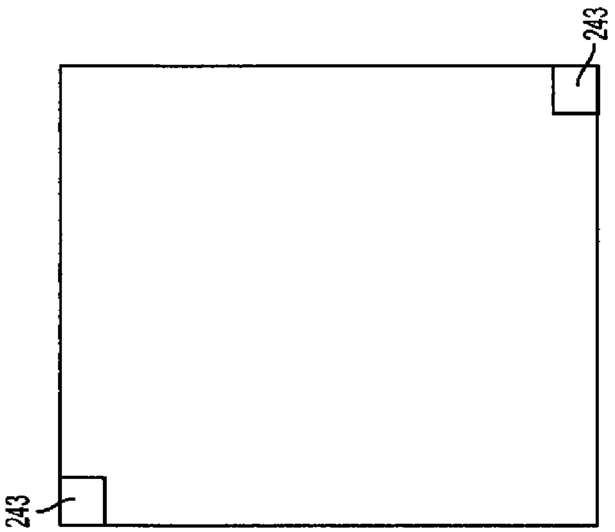

In the embodiments described above, the photosensor array was a linear photosensor array, which provides a one-dimensional slice of the spatial varying optical pattern corresponding to the markings on the recording medium. In other embodiments, the photosensor array can be a two-dimensional photosensor array 238. FIG. 10*a* schematically shows a view of a two-dimensional arrangement of photosensors 236 on two-dimensional photosensor array 238. FIGS. 10*b*, 10*c*, and 10*d* show three different examples of marking patterns 241, 242, and 243 respectively; which could be with two-dimensional photosensor array 238 in order to identify the type of recording medium. The view of photosensor array 238 in FIG. 10*a* is magnified relative to the markings patterns in FIGS. 10*b*, 10*c*, and 10*d* in order to show the photosensors 236 more clearly. Two-dimensional photosensor array 238 has a length L and a width W across which the photosensors are disposed, where typical dimensions can range from about 1 mm to 10 mm for both L and W.

Marking patterns 241, 242, and 243 in FIGS. 10*b*, 10*c*, and 10*d*, are provided in two diagonally opposite corners on the backside of the recording medium. For printing systems to identify recording media with marking patterns in such location, two-dimensional photosensor array 238 would be located adjacent to a corner location of the media input location, such as near the corner of a media input tray. For media, such as 4 by 6 inch media, having a pair of long sides and a pair of short sides, the media can be loaded (with printing side down) in two different orientations in the media input location, where the two orientations are rotated 180 degrees from each other. By providing the marking patterns on two diagonally opposite corners, it does not matter which orientation the user loads the media. A marking pattern will still be located adjacent to two-dimensional photosensor array 238. Marking patterns 241, 242, and 243 are rotationally symmetric in the examples of FIGS. 10*b*, 10*c*, and 10*d*; so that they look the same to the two-dimensional photosensor array 238, whichever orientation the user loads the recording medium. In other embodiments, the marking patterns in the two different corners can be nonsymmetrical, so that the printing system can recognize which end of the recording medium is at the lead edge, for example. Marking patterns do not necessarily need to consist of bars of uniform spacing as in FIGS. 10*b* and 10*c*. Other types of two-dimensional marking patterns that can be used to identify types of recording media include bars with nonuniform widths and spacings, dot patterns, alphanumerics, etc.

An advantage of two-dimensional photosensor array 238 for identifying recording media type is that more information can be provided in a small region. Therefore, marking patterns can be used that are less obtrusive than the patterns in the example shown in FIGS. 6*a* and 6*b* for use with a linear photosensor array 230. In some embodiments, where markings are provided using nearly invisible infrared-absorbing inks for example, the markings can be sufficiently nonobtrusive that they can be provided on both sides of the recording medium without interfering substantially with the quality of a printed image. Such two-sided markings can be used for recording media that has been treated on both sides so that it can be used for duplex printing.

Manufacturer's code markings can be applied to the recording medium at different stages in the manufacturing process. Recording media is typically made in large webs that are subsequently cut to the desired size. An advantage of markings such as those in FIGS. 6*a* and 6*b* is that they can be marked on the recording medium web prior to cutting. Media identification methods such as that described in U.S. Pat. No. 8,033,628, or with linear photosensor array 230 (with reference to FIGS. 6*a* and 6*b*) are compatible with such markings provided prior to cutting. The anchor bars 225 and 226 (first and second, respectively) provide a location reference, and the first identification marks 228 or second identification marks 229 provide information relative to the anchor bars in order to identify the recording medium type. However, markings, such as 241, 242, and 243 that are provided for media type identification using a stationarily mounted two-dimensional photosensor array 238 need to be provided at a particular location on the recoding medium, such as in a corner. Therefore, such marking patterns would typically be applied during media manufacturing at a finishing step after cutting the media to size.

A typical array size for a two-dimensional photosensor array 238 is 30 rows and 30 columns of photosensors, but arrays having more or fewer photosensors can also be used. As explained above relative to the linear photosensor array 230, the electronic output signal of a photosensor is larger when more light is received, so that a spatially-varying photosensor array output signal 421 is provided by two-dimensional photosensor array 238 relative to marking patterns such as 241, 242, and 243. It has been found that two-dimensional image analysis using a fast fourier transform, for example, can provide a different code value corresponding to each different marking pattern. Code reference values corresponding to different recording media types can be stored as a look-up table in memory in printer controller 14. The code value that is provided by the image analysis of the photosensor signal provided by photosensor array 238 is then compared to the table of code reference values in order to identify the type of recording medium that is located in the media input location 372.

In some embodiments, the two-dimensional photosensor array is held in contact (or at a predetermined spacing) with the backside of the top sheet of medium 371 by a spring 234, a weight, or other such means as described above relative to the linear photosensor array. In other embodiments, various optical elements such as lenses, mirrors, light pipes, fiber optic bundles 233, etc. bring light either from the light source to the recording medium 20 or from the recording medium 20 to the photosensor array (one-dimensional or two-dimensional 238).

Figure 11:
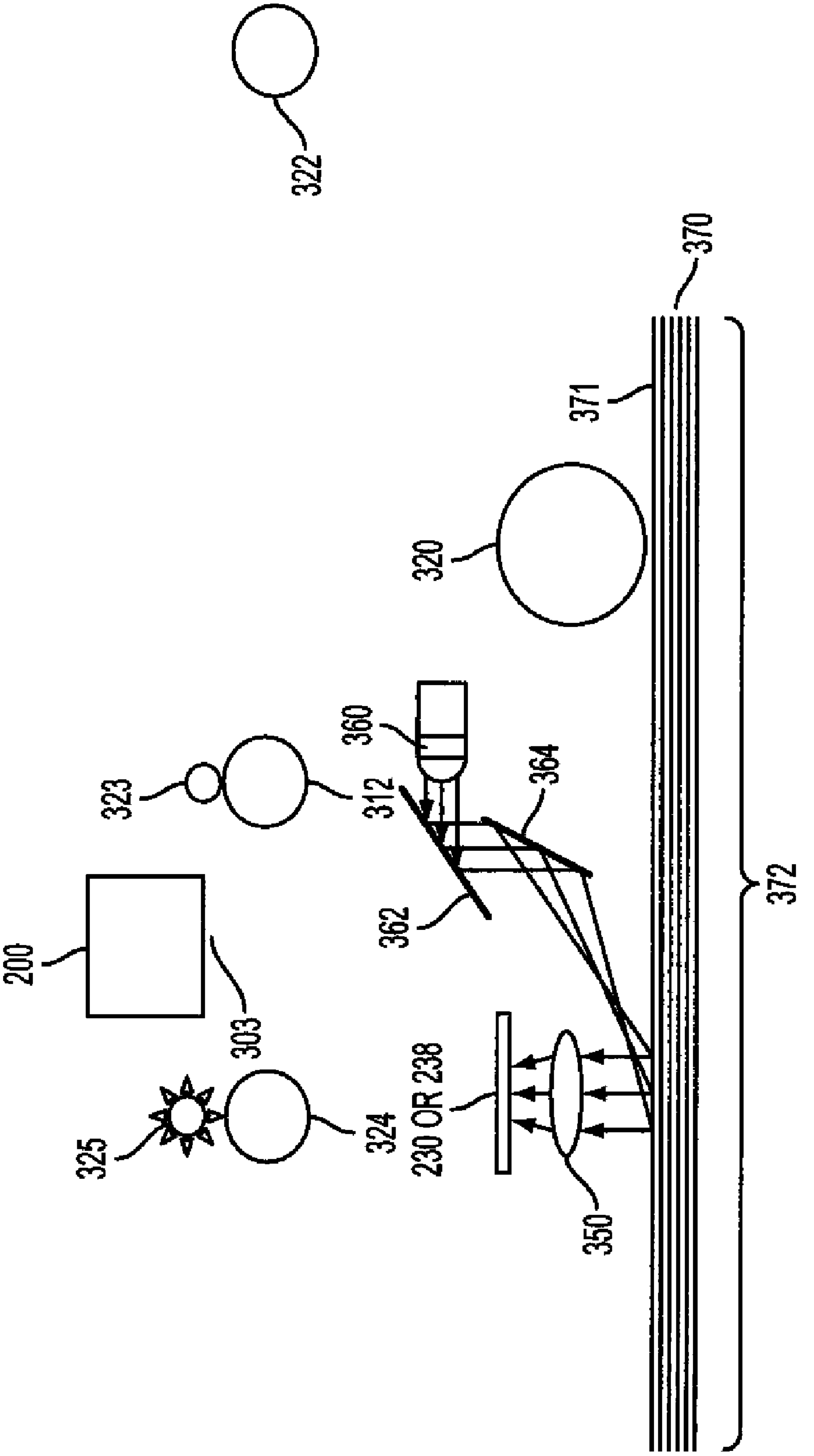
FIG. 11 shows a schematic view of an optical path between the light source, the media input location and the photosensor array where the optical path includes mirrors and a lens.

FIG. 11 schematically shows the same view as FIG. 5, but in the example of FIG. 11, there are two mirrors 362 and 364 positioned within a first optical path section between the light source 360 and the top sheet of medium 371 from stack of media 370 that is stored in media input location 372. Additionally, there is a lens 350 in a second optical path section between media input location 372 and the array of photosensors (either linear photosensor array 230 or two-dimensional photosensor array 238). FIG. 11 is intended only to show various optical elements that can be used, and not necessarily proper orientations. Arrows represent light beams. Arrowheads have been removed in some instances for better clarity. In the example of FIG. 11, it is not required that the photosensor array be in contact with the backside of top sheet of medium 371.

Figure 12:
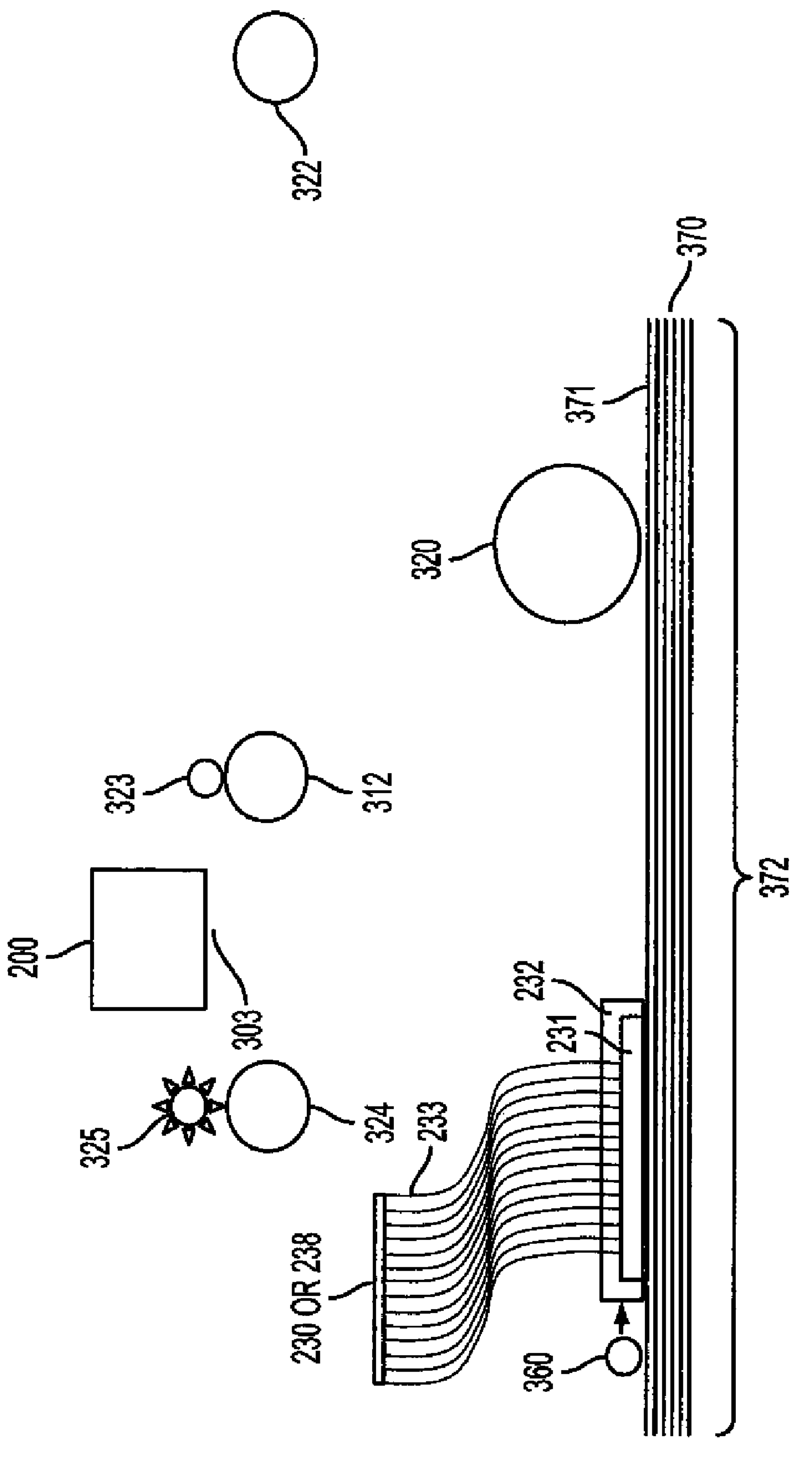
FIG. 12 shows a schematic view of an optical path between the light source, the media input location and the photosensor array where the optical path includes a fiber optic bundle.

FIG. 12 schematically shows the same view as in FIG. 5, but in the example of FIG. 12, a light source 360 provides light to an extended region of top sheet of medium 371 located in media input location 372, where the first optical path section from light source 360 to the extended region in the media input location 372 includes light distributing bar 232. A fiber optic manifold 231 is positioned adjacent to light distributing bar 232 and brings light from the illuminated region of top sheet of medium 371 to a photosensor array (one-dimensional photosensor array 230 or two-dimensional photosensor array 238, depending on the embodiment) along a second optical path section that includes a fiber optic bundle 233.

In all of the embodiments described above, media type identification can begin as soon as the previous top sheet of medium 371 has been advanced far enough that light from light source 360 can strike a sufficient region of marking patterns on the new top sheet of medium 371 that was underneath the previous top sheet of medium 371. In particular, identification of the recording medium type for new top sheet of medium 371 can begin while the printing system is printing on previous top sheet of medium 371, or while the printing system is performing maintenance operations using maintenance station 330 on printhead chassis 250, or while doing other printing operations. In this way, when the next print is required, the printing system controller 14 already knows what type of recording medium is present and image rendering can begin in image processing unit 15, thus saving time before the image can be printed.

Commonly assigned co-pending U.S. patent application Ser. No. 12/332,616 discloses different aspects of media sensing at the media input location using photosensor arrays and is incorporated by reference herein in its entirety.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Substrate
120 First nozzle array
121 Nozzles in first nozzle array
122 Ink delivery pathway (for first nozzle array)
130 Second nozzle array
131 Nozzles in second nozzle array
132 Ink delivery pathway (for second nozzle array)
181 Droplet(s) ejected from first nozzle array
182 Droplet(s) ejected from second nozzle array
200 Carriage
221 First type recording medium (first media type)
222 Second type recording medium (second media type)
225 First bar of anchor bar pairs
226 Second bar of anchor bar pairs
228 First identification marks (for first type recording medium)
229 Second identification marks (for second type recording medium)
230 Linear photosensor array
231 Fiber optic manifold
232 Light distributing bar
233 Fiber optic bundle
234 Spring
236 Photosensor(s)
238 Two-dimensional photosensor array
241 Marking pattern
242 Marking pattern
243 Marking pattern
250 Printhead chassis
251 Printhead die
253 Nozzle array
254 Nozzle array direction

256 Encapsulant
257 Flex circuit
258 Connector board
262 Multi-chamber ink supply
264 Single-chamber ink supply
300 Printer chassis
302 Paper load entry direction
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction
320 Pick-up roller
322 Turn roller
323 Idler roller(s)
324 Discharge roller
325 Star wheel(s)
330 Maintenance station
340 Pick-up arm
341 Pivot axis
342 Pick-up roller axle
343 Sensor array assembly
344 Sensor array assembly pivot arm
345 Sensor array assembly pivot mount
350 Lens
360 Light source
362 Mirror
364 Mirror
370 Stack of media
371 Top sheet of medium
372 Media input location
380 Carriage motor
382 Carriage guide rail
383 Encoder fence
384 Belt
390 Printer electronics board
392 Cable connectors
421 Photosensor array output signal
425 Peaks
426 Peaks
428 Peaks

The invention claimed is:

1. A printing system comprising:

a media input location for storing a recording medium prior to transport within the printing system for subsequent printing;

a light source directed toward an extended region of the media input location;

an array of photosensors restricted to only a substantially perpendicular movement relative to a plane of the media input location; and an optical path including a first optical path section from the light source to the extended region of the media input location and a second optical path section from the extended region of the media input location to the array of photosensors.

2. The printing system claimed in claim 1, wherein the array of photosensors comprises a one-dimensional array of photosensors.

3. The printing system claimed in claim 1, wherein the array of photosensors comprises a two-dimensional array of photosensors for reading a coded pattern.

4. The printing system claimed in claim 1, wherein the first optical path section includes a light distributing body.

5. The printing system claimed in claim 4, the array of photosensors including an array length, wherein the light distributing body comprises a light distributing bar having a length that is greater than or equal to the array length.

6. The printing system claimed in claim 1, the array of photosensors including an array length L, wherein 5 mm<L<75 mm.

7. The printing system claimed in claim 1, wherein the array of photosensors comprises a contact image sensor.

8. The printing system claimed in claim 1, wherein the optical path includes a lens.

9. The printing system claimed in claim 1, wherein the optical path includes a mirror.

10. The printing system claimed in claim 1, wherein the photosensors in the array of photosensors are infrared photosensors.

11. The printing system claimed in claim 1, wherein the array of photosensors is pushed by spring force toward the media input location.

12. The printing system claimed in claim 1, wherein the array of photosensors is pivotally mounted.

13. The printing system claimed in claim 3, the array of photosensors including a length L and a width W, wherein 1 mm<L<10 mm, and 1 mm<W<10 mm.

14. The printing system claimed in claim 1, wherein the second optical path section includes a fiber optic bundle.

15. A method for identifying a type of recording medium within a printing system, the method comprising:

providing a media input location for storing a recording medium prior to transport within the printing system for subsequent printing;

providing a light source;

providing an array of photosensors restricted to only a substantially perpendicular movement relative to a plane of the media input location;

providing an optical path including a first optical path section from the light source to the extended region of the media input location and a second optical path section from the extended region of the media input location to the array of photosensors;

providing a printing system controller including a table of data corresponding to spatially varying optical patterns for a plurality of recording media types;

directing light from the light source toward an extended region of the media input location;

receiving light from the light source by a plurality of photosensors of the array of photosensors, the light having been reflected from extended region of the media input location to produce an electronic signal in each of the plurality of photosensors;

transmitting the electronic signals to the printing system controller to provide data corresponding to a spatially varying pattern; and comparing the data corresponding the spatially varying pattern to the table of data, thereby identifying the type of recording medium that is stored in the media input location of the printing system.

16. The method claimed in claim 15, wherein the array of photosensors comprises a one-dimensional array of photosensors, and the step of transmitting the electronic signals to the printing system controller further comprises providing data corresponding to a one-dimensional spatial variation of the pattern.

17. The method claimed in claim 15, wherein the array of photosensors comprises a two-dimensional array of photosensors, and the step of transmitting the electronic signals to the printing system controller further comprises providing data corresponding to a two-dimensional spatial variation of the pattern.

18. The method claimed in claim 15, wherein the table of data corresponding to spatially varying optical patterns includes data corresponding to a plurality of media-type codes.

19. The method claimed in claim 15, further comprising the step of simultaneously performing printer maintenance while the stored recording medium is being identified by the printer system controller.

20. The method claimed in claim 15, further comprising the step of simultaneously performing printing operations.

* * * * *